Aug. 3, 1937.  E. RAUCH  2,089,135
DIRECTION INDICATOR
Filed Oct. 26, 1936
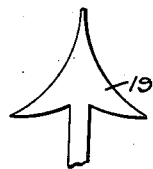
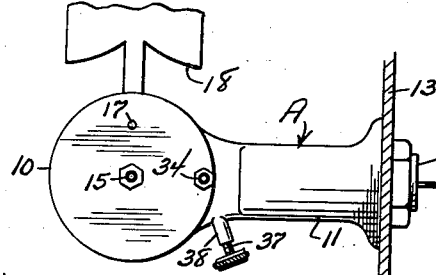
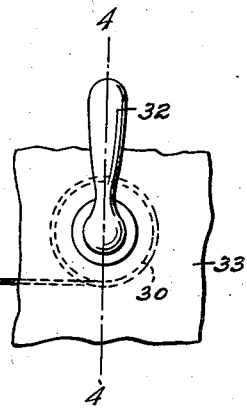
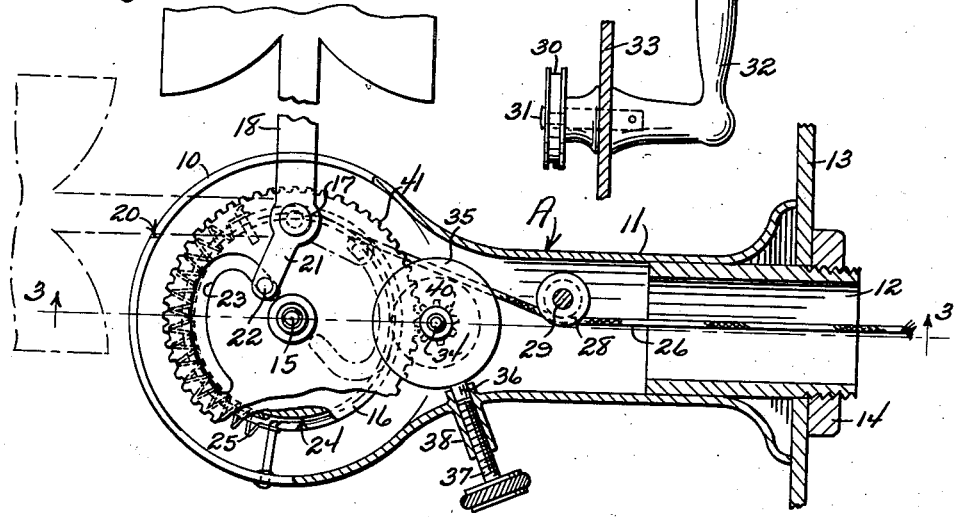
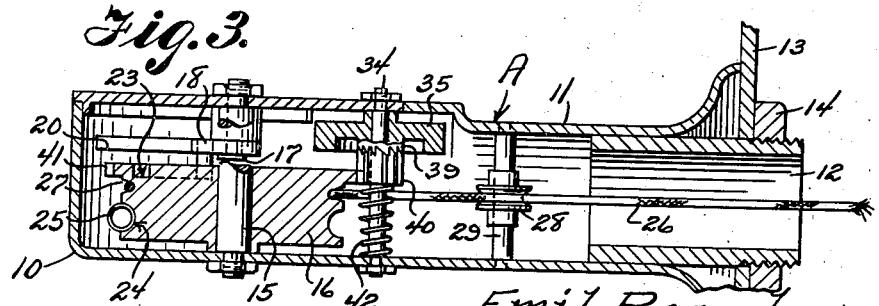
Emil Rauch INVENTOR
BY Victor J. Evans & Co.
ATTORNEYS Patented Aug. 3, 1937

2,089,135

UNITED STATES PATENT OFFICE 2,089,135

DIRECTION INDICATOR

Emil Rauch, Billings, Mont.

Application October 26, 1936, Serial No. 107,700

1 Claim. (Cl. 116—52)

The invention relates to an indicator and more especially to a direction indicator for vehicles.

The primary object of the invention is the provision of an indicator of this character, wherein an operator of a motor vehicle can assure a direction signal indicative of the direction of turn of such vehicle, particularly a left hand turn, the indicator being manually controlled and is in convenient reach of the driver of the vehicle or the operator thereof.

Another object of the invention is the provision of an indicator of this character, wherein through the swinging action of an arm simulating a semaphore pedestrians and oncoming traffic will be advised of the direction of turn of the vehicle carrying the indicator, that is to say, a left hand turn of such vehicle, the arm being controlled and operated in a novel manner.

A further object of the invention is the provision of an indicator of this character, wherein the same is susceptible of fitting upon the body of the vehicle and the control therefor on the instrument board to be in convenient reach of the operator of the vehicle so that the indicator can be actuated for the issuing of a signal indicative of a left hand turn of such vehicle, the indicator being compact and possessing but few parts.

A further object of the invention is the provision of an indicator of this character, which is simple in construction, thoroughly reliable and efficient in operation, neat in appearance, convenient for the working thereof, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary sectional view through the body of a vehicle showing an indictator constructed in accordance with the invention applied thereto, the control for the indicator being mounted upon an instrument board of such vehicle.

Figure 2 is a longitudinal sectional view through the indicator.

Figure 3 is a sectional view on the line 3—3 of Figure 2.

Figure 4 is a sectional view on the line 4—4 of Figure 1.

Similar reference characters indicate corresponding parts throughout the several views in the drawing.

Referring to the drawing in detail, the indicator comprises a suitable casing A formed with a circular head 10 and a hollow stem 11, respectively. This stem has fixed therein a coupling sleeve 12 which is passed through a suitable opening formed in the side of the body of a motor vehicle, a portion of this side being indicated at 13 and such sleeve carries a lock nut 14 so that the casing A will be made secure and will extend laterally without the body of such vehicle at the point desired preferably forwardly of the operator's seat within the body.

Centrally fitted in the head 10 is an axle 15 carrying interiorly of said head a pulley 16 while concentric to the axis of the axle 15 is a pivot 17 supporting a swinging signal arm 18 simulating a semaphore arm having an arrow shaped tip 19 at its outer free end. This arm 18 swings vertically through a slot 20 provided in the peripheral wall of the head 10 so that such arm may swing from vertical to horizontal position or vice versa in a manner presently described.

The arm 18 is formed with a crank 21 carrying a follower stud or pin 22 engageable in a cam slot 23 provided in the side face of the pulley 16 next to the crank 21. Thus when the pulley 16 is rotated the stud or pin 22 following the cam slot 23 causes the lowering or raising of the arm 18 and through such movements a direction signal can be indicated in that when the arm is swung to a horizontal position it is significant that the vehicle carrying the indicator is to make a left hand turn.

The pulley 16 in its periphery is provided with a channel or groove 24 for accommodating a coiled tensioning spring 25 which is connected with said pulley and with the head 10 at its ends and the purpose of this spring is to urge the arm 18 to swing in one direction.

The pulley 16 has trained about the same an actuating cable or cord 26 fitting a guide channel or groove 27 provided in said pulley and trained over a guide pulley 28 having its axle 29 journaled in the stem 11 and carried through this stem 11 onto a peripherally grooved wheel 30 fixed to the turning arbor 31 of a throw handle 32, the arbor being journaled in an instrument board of the vehicle, a portion of the board being indicated at 33, and such handle is located conveniently to an operator occupying the driver's seat of such vehicle preferably to the left of the steering mechanism for the vehicle, the cord or cable being fixed to the pulley 16 and the wheel 30, respectively, at its opposite ends.

Journaled upon an arbor 34 fitted in the casing A is a braking wheel 35 with which engages a friction shoe 36 upon an adjusting screw 37 threaded in a barrel formation 38 on the casing A. The braking wheel 35 has coupling by a ratchet acting clutch 39 with a pinion 40 meshing with a gear 41 formed with the pulley 16 and thus braking action can be imparted to the pulley 16 when turning in one direction while the ratchet acting clutch 39 will release braking action when the pulley turns in the opposite direction. The ratchet acting clutch 39 has coacting with the pinion 40 a tensioning spring 42 which allows declutching action against the resistance of the spring 42 of such clutch when the pulley 16 is turned in one direction the pinion 40 being suitably slidably splined on the arbor 34. It should be apparent from Figure 3 of the drawing that when the pinion 40 through ratchet action of the clutch 39 against the resistance of the spring 42 overrides the wheel 35 the said pinion is declutched from the said wheel and thus relieved of the braking action of the latter.

It is preferable to have the spring 25 function to move the arm 18 in normal non-signaling position while the handle 32 when manually operated moves the arm to a signaling position for the issuance of a signal indicative of the turning of the vehicle to the left. The brake will function to slow the action of the indicator or to allow the speeding up of such action thereof.

What is claimed is:

A direction indicator of the kind described comprising a casing having a head and a hollow stem, a coupling in the stem for the fastening of the casing to a vehicle body, a rotatable pulley journaled in said head and having a cam slot, a signaling arm pivoted in the head and having engagement in the slot for the swinging of the arm in reverse directions, a spring active upon the pulley to hold the arm in normal non-signaling position, means adapted to be located within a vehicle body and connected with the pulley for actuating the same to swing the arm from normal non-signaling position to a signaling position, a braking wheel rotatably connected with the pulley, and a brake shoe adjustably fitted in the casing and active upon said braking wheel to regulate the speed of action of the pulley.

EMIL RAUCH.